United States Patent [19]
Rush et al.

[11] Patent Number: 4,886,706
[45] Date of Patent: Dec. 12, 1989

[54] FIBROUS POLYACRYLONITRILE REINFORCING MIXTURE FOR FRICTION PRODUCT APPLICATIONS, AND METHOD OF MAKING SAME

[75] Inventors: Hughey A. Rush; Billy B. Hibbard, both of Williamsburg, Va.; Johnson L. Pursoo, Lake Jackson, Tex.; John W. Lindsay; Thomas E. Smith, both of Williamsburg, Va.; Kenneth Harper, Lanexa, Va.; MIchael V. Tullos, Grimstead, Va.; James E. Davis, Gloucester, Va.

[73] Assignee: BASF Corporation, Williamsburg, Va.

[21] Appl. No.: 24,644

[22] Filed: Mar. 11, 1987

[51] Int. Cl.⁴ .............................................. D04H 1/58
[52] U.S. Cl. .................................... 428/288; 428/290; 428/297; 523/152; 523/153; 523/155; 523/156; 523/157; 523/158
[58] Field of Search ............... 523/152, 153, 154, 155, 523/156, 157, 158; 428/297, 288, 290

[56] References Cited
U.S. PATENT DOCUMENTS 2,558,730  7/1951  Cresswell ........................... 264/182
2,847,405  8/1958  Mallison ............................ 526/229.5
2,899,262  8/1959  Stanton et al. ....................... 264/182

Primary Examiner—James J. Bell
Attorney, Agent, or Firm—Edward F. Sherer; Rupert B. Hurley, Jr.; Tom R. Vestal

[57] ABSTRACT

An improved fibrous polyacrylonitrile mixture for use in friction products enables the production of low resiliency preforms by mixing an additive with a polyacrylonitrile wet gel. The additive is incorporated into the fiber in extremely large amounts. The additive is a member selected from the group consisting of:
(a) polyethylene glycol esters of pelargonic acid; or
(b) polyethylene glycol esters of enanthic, caprylic or capric acids; or
(c) blends of polyethylene glycol esters of enanthic, caprylic, pelargonic, or capric acids; or
(d) blends of polyethylene glycol esters of carboxylic acids derived from natural products containing at least 50% by weight of carboxylic acids containing less than 14 carbon atoms; or
(e) reaction products of ethylene oxide and carboxylic acid amides wherein at least 70% of the acids from which the amide is derived contain between 16 and 20 carbon atoms.

11 Claims, 2 Drawing Sheets

FIGURE 1
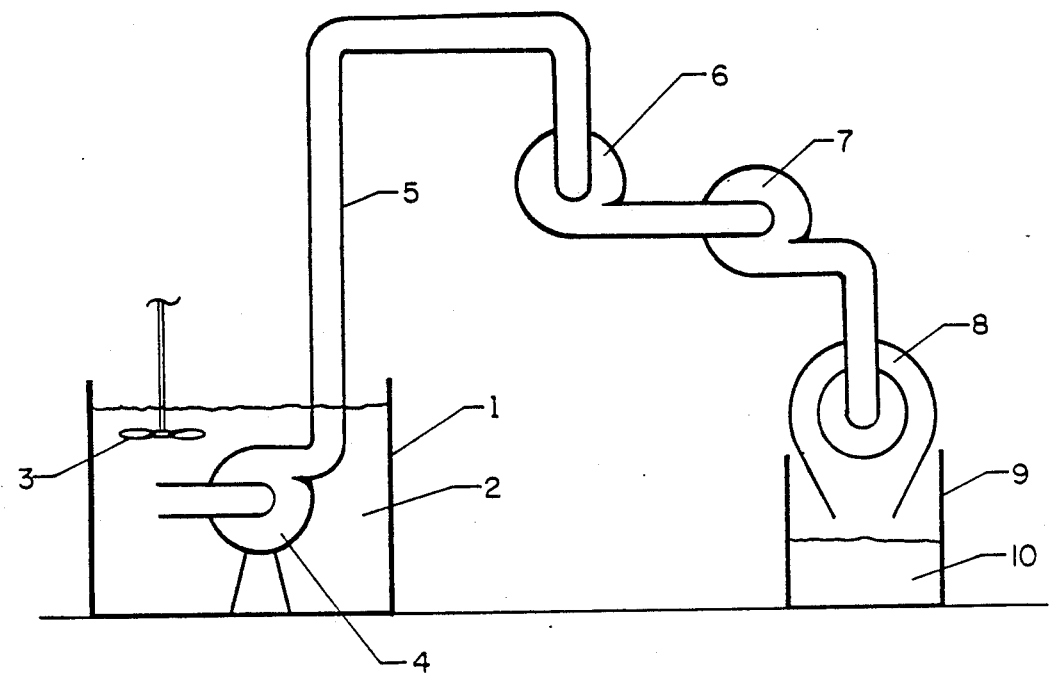
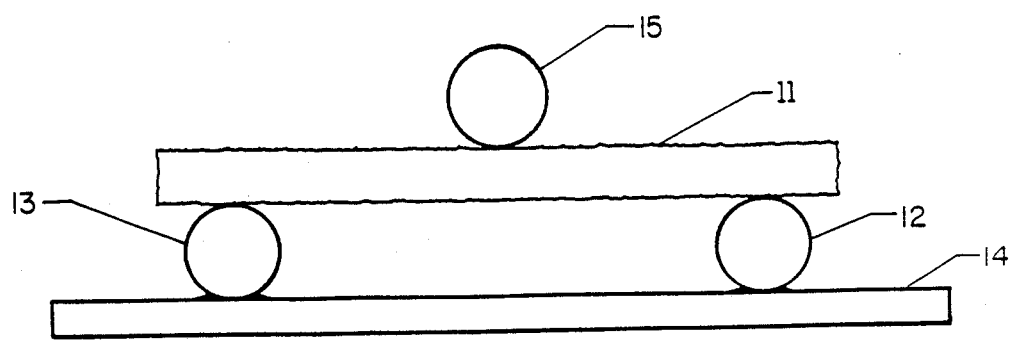
FIGURE 2

FIBROUS POLYACRYLONITRILE REINFORCING MIXTURE FOR FRICTION PRODUCT APPLICATIONS, AND METHOD OF MAKING SAME

BACKGROUND AND SUMMARY OF THE INVENTION

The present invention pertains to an improved fibrous polyacrylonitrile mixture for use in the manufacture of friction products. The improved mixture is comprised of cut and refined polyacrylonitrile fibers in conjunction with an additive selected from the group consisting of:

(a) polyethylene glycol esters of pelargonic acid; or
(b) polyethylene glycol esters of enanthic, caprylic or capric acids; or
(c) blends of polyethylene glycol esters of enanthic, caprylic, pelargonic, or capric acids; or
(d) blends of polyethylene glycol esters of carboxylic acids derived from natural products containing at least 50% by weight of carboxylic acids containing less than 14 carbon atoms; or
(e) reaction products of ethylene oxide and carboxylic acid amides wherein at least 70% of the acids from which the amide is derived contain between 16 and 20 carbon atoms.

A decline in the use of asbestos in friction products has been occurring due to the resulting health hazards asbestos has created in both the workplace and the environment. Asbestos has provided uniquely favorable frictional characteristics and physical properties in brake and bearing products. Currently there is considerable research activity in an effort to find a suitable replacement for asbestos in friction product end uses. It is the object of the present invention to provide an asbestos substitute for the manufacture of friction products.

It has been found that of the synthetic fibers, acrylic fibers are favorably suited for use in friction products, as they do not melt as readily as nylon, polyester, polypropylene, etc. Furthermore, under appropriate conditions of heat and pressure, acrylic fibers are transformed into carbon fiber precursors and eventually into carbon fibers. These characteristics make acrylic fibers especially suited for use in friction products.

The manufacture of friction products (e.g. brake blocks) is carried out by placing a mixture into a first mold, and thereafter applying pressure to the mixture for a period of time in order to create a "preform". The preform is then removed from the first mold and placed into a second mold within which the preform is subjected to both heat and pressure. During the application of heat and pressure in the second mold, the preform is transformed into a friction product (e.g. a brake block).

In this manufacturing process, the preform must have a degree of integrity high enough so that it may be removed from the first mold and placed in the second mold without significant disintegration. All mixtures which are subjected to the preforming operation tend to "rebound" from the pressure exerted in the preforming operation. Theoretically, it is believed that the lower the degree of resilience, the better the quality of the preform. Too much resilience creates two detrimental consequences: (1) the degree of resilience is so high that the preform disintegrates upon the necessary handling required to remove the preform from the first mold and place it in the second mold; (2) the degree of resilience is so great that the preform expands by an amount so great that the preform will not fit into the second mold.

Although acrylic fibers have advantages (over many other synthetic fibers) in friction product applications, acrylic fibers having no liquid additives thereon have not been found to enable the production of satisfactory preforms. Furthermore, it has been found that in order to apply an operable amount of these liquid additives to the acrylic fibers, the fibers must be in a "wet gel" state. The structure of a wet gel is extremely "open" and absorbent (i.e. the polymer structure will hold large amounts of liquids, similar to a sponge) in comparison with a collapsed polymer structure. In addition, it has been found necessary to refine the wet gel fibers in order to create a fibrous pulp, rather than using continuous filaments, cut staple, or even comminuted fiber in the manufacture of friction products. Most preferably, the refining of the acrylic wet gel is performed in the liquid additive.

It has been found that liquid additives to the acrylic wet gel are taken up and thereafter held in amounts much greater than expected. For example, PEG - 400 monopelargonate has been applied to wet gel to a saturation point, after which the excess pelargonate was removed by centrifugation. The wet gel was then dried in a dryer, which caused the polymer structure to collapse. The resulting dried fiber was analyzed for PEG - 400 monopelargonate content, and it was found that the fiber contained over 50% (on weight of fiber) of PEG - 400 monopelargonate. This is extremely unusual as it was not believed previously that more than about 2% liquid (on weight of fiber) could be held by a dried acrylic fiber.

As described herein, the phrase "liquid additive" is intended to comprise not only additives which are themselves a liquid at room temperature and 1 atm. pressure, but also compounds which are liquefied, dispersed, or dissolved. It has been conceived that liquefied, dispersed, or dissolved additives within the group (a) through (e) above will be operable in enabling one to achieve the advantages of the present invention.

Furthermore, it has been unexpectedly found that certain liquid additives, when incorporated into the acrylic fiber in amounts greater than about 37% (on weight of fiber), dramatically decreased the resilience of the fiber as measured by a "white pellet test". This test is performed by placing a weighed 5 gram sample of dried, refined fiber having additive thereon into a press having a 1 inch (circular) cross-sectional area. The press is used to apply 5000 pounds of pressure to the 5 gram sample. The pressure was held for approximately 60 seconds. The thickness (i.e. height) of the pellet was measured while the pellet remained under pressure, this measurement being taken approximately 60 seconds after pressure was applied to the fiber. The fiber, having been pressed into a cylindrical "pellet" shape, remained in the press after pressure was removed, and the pellet was then removed from the press. The height of the pellet was then measured again approximately 5 minutes after removal of the pressure from the pellet. The percent rebound (i.e. resilience) was calculated as follows:

$$\% \text{ rebound} = \left[ \frac{h_{final}}{h_{original}} \times 100 \right] - 100$$

BRIEF DESCRIPTION OF THE DRAWINGS

FIG. 1 is a schematic representation of a portion of a process for making refined fiber/additive utilized in Examples 1 through 8.

FIG. 2 is a cross-sectional view of a 3-point breaking apparatus utilized in conjunction with the Instron testing machine which was used for measuring preform strength.

DETAILED DESCRIPTION OF THE PREFERRED EMBODIMENTS

Examples 1 through 8

Figure 3:
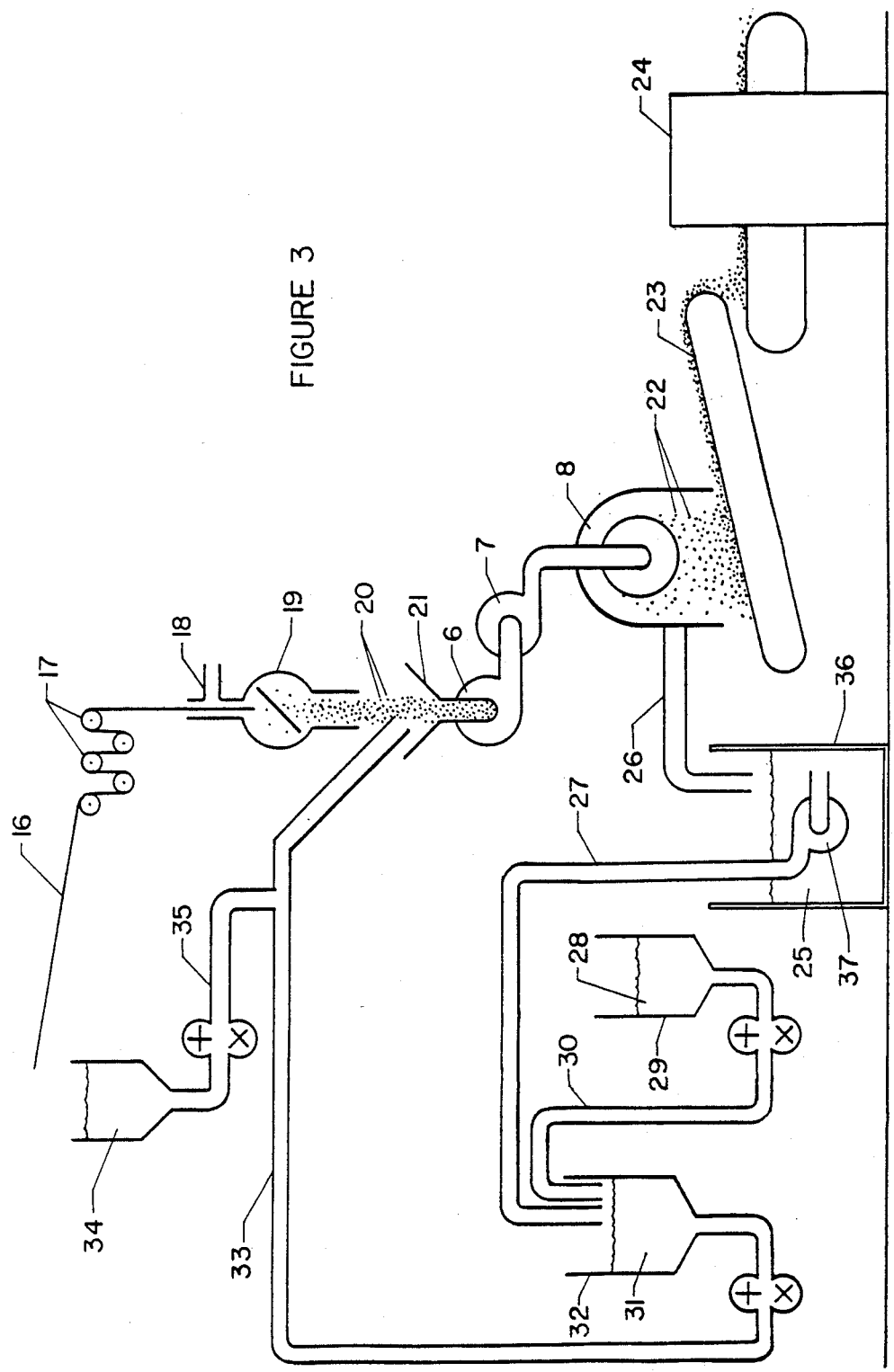
FIG. 3 is a schematic representation of a most preferred process for making the improved mixture of the present invention.

The white pellet test was carried out on refined homopolymer (i.e. 100% polyacrylonitrile units) acrylic fiber wet gel having additives thereon and therein. The acrylic fiber, which was cut from acrylic wet gel tow, can be manufactured according to the following U.S. patents, which are hereby incorporated by reference:
(a) U.S. Pat. No. 2,847,405: polymerization
(b) U.S. Pat. No. 2,916,348: wet spinning with inorganic solvents
(c) U.S. Pat. No. 2,558,730: wet spinning with inorganic solvents
(d) U.S. Pat. No. 2,899,262: production of wet gel polyacrylonitrile tow During manufacture of the wet gel, the extrudate was stretched approximately 10×. The acrylic wet gel was cut to a staple length of 0.375 inches. The denier per filament was 1.5.

The wet gel staple is then refined in water by the process shown in FIG. 1. The wet gel staple is placed into a tank (1) and is then dispersed in water. The dispersion (2) of wet gel staple and water is created by mixing 50 pounds of water with each pound of fiber (on a dry weight basis). One or more stirrers (3) are used to keep the wet gel staple dispersed in the water. A pump (4) is used to pump the dispersion (2) through a conduit (5) and directly into the first of a pair of refiners (6 and 7). The staple was then refined in the first refiner, after which the staple passed through the second refiner, where the staple was refined still further. The majority (by weight) of the wet gel which emerged from the second refiner had a length of between 1 millimeters and 4 millimeters. The average length of the refined product was between 1 and 2 millimeters. The refined gel was then dewatered by passing the refined gel into a centrifuge (8). The refined gel went into the centrifuge at a ratio of 50 lbs. water per pound of fiber (on a dry weight basis). The product emerged from the centrifuge at a ratio of 60 lbs. water per 40 lbs. fiber (on a dry weight basis). After centrifugation, the pulped wet gel (10) was collected in a container (9). Four pound aliquots (on a dry fiber basis) of pulped wet gel staple were placed into a Littleford model FM-130-D rotary mixer with chopper (not shown in FIG. 1). The Littleford mixer was obtained from Littleford Bros., Inc., 7451 Empire Drive, Florence, KY 41042. The plow speed was set to 155 rpm. The chopper speed was set to 3515 rpm. The chopper was comprised of a 6 inch diameter double starwheel, each wheel having 16 teeth, plus an 8 inch diameter double starwheel, each wheel having 4 arms. In this mixer the pulped wet gel staple was blended for two minutes in order to "open" the fiber. After the opening process, blending was continued while a liquid additive was pumped into the mixer and onto the pulped fiber. The liquid was pumped into the mixer over a period of six minutes. The additive was combined with fibrous pulp at a ratio of 1 part fiber (on a dry weight basis) to 0.538 parts additive. After the additive was combined with the pulped fiber, the additive and fiber pulp were blended for another 5 minutes. At this point the additive was thoroughly intermixed with the pulped fibrous gel. The gel pulp/additive mixture was next run through a dryer (for 12 minutes residence time). The environment within the dryer was maintained at 50° c wet bulb and 130° c dry bulb. The fiber emerging from the dryer was comprised of 0.5%–1.0% moisture. Here the wet gel polymer structure was "collapsed" by the addition of heat, which caused removal of water from the gel structure. The resulting product (i.e. a dried homopolymer acrylic staple fiber having approximately 54% percent additive on weight of fiber, i.e. owf) was removed from the dryer and was allowed to cool at room temperature.

The additive always comprised an effective amount of an antioxidant in order to prevent oxidation of the fiber in the drying operation. The antioxidant used was known as Irganox 1076 TM which was applied with the application of the finish to the fiber, the antioxidant being applied at approximately 0.55%, on weight of dry fiber. Irganox 1076 TM is actually octadecyl-3,5-di-tert-butyl-4-hydroxyhydrocinnamate. Irganox 1076 TM is sold by Ciba Geigy Corp of Ardsley, N.Y., 10502.

The data reported for Examples 1–8 was obtained by preparing the fiber, pulp, additive, and pulp/fiber mixture as described above. The pulp/additive was then subjected to the "white pellet test" (as described above) and the expansion was calculated by the formula given above.

TABLE I

| Example Number | Additive Used | Amt. Additive Used (owf), % | White Pellet Expansion, % |
|---|---|---|---|
| 1 | PEG–400 Monopelargonate | 54 | 11.2 |
| 2 | POE (7) Coconut fatty acid | 54 | 30.8 |
| 3 | POE (9) Coconut fatty acid | 54 | 24.7 |
| 4 | POE (14) Coconut fatty acid | 54 | 28.2 |
| 5 | POE (15) Cocoamine | 54 | 27.1 |
| 6 | POA (8) Cetyl-stearyl Alcohol | 54 | 26.5 |
| 7 | POE (12) Stearic Monoethanolamide | 54 | 17.2 |
| 8 | POE (14) Monoisostearate | 54 | 25.0 |

As can be seen in the data in Table I, the additive used in Example 1, PEG-400 monopelargonate, yielded a superior (i.e. lower) white pellet expansion when compared to the remaining additives. The additive used in Example 7 (POE (12) Stearic monoethanolamide) was significantly better than the additives used in Examples 2–6 and 8, but the resilience produced by using the additive of Example 7 remained significantly greater than the resilience provided by the PEG-400 monopelargonate.

It has been found that the additives producing the lowest resiliency as measured by the white pellet test also yield preforms which have the greatest integrity. The pulped fiber/additive examples 1–8 were used to make preforms, as is described below.

Preforms were made by combining several ingredients with a pulp/additive sample. The ingredients used and the proportions used were proprietary. Resultsf tests performed on these propriety preforms are shown in Table II. Other nonproprietary ingredients and proportions are known to yield results at least as advantageous as the proprietary ingredients and proportions used to generate the data diven in Table II. These ingredients and proportions are as follows:

| | |
|---|---|
| Barytes | 22.8% |
| Resin | 19.0% |
| Graphite | 4.3% |
| Rubber Dust | 5.0% |
| Friction Particles | 8.5% |
| PMF | 42.0% |

The "PMF" is pulverized mineral fiber, and can be obtained from Jim Walters Resources, Inc., P.O. Box 5327, Birmingham, Al., 35207. The preform was made by mixing 2 pounds of these ingredients together in an Eirich mixer model R02 (obtained from Eirich Machine Co. of Toronto, Canada). The ingredients were mixed for 10 minutes, the Eirich mixer having a stirrer which was rotating at a tip speed of 25.2 meters/second. After 10 minutes of mixing, 5% (by weight) of the fiber pulp/additive was added to the mixed ingredients in the Eirich mixer. The mixer was then allowed to mix all of this for an additional 5 minutes, again at a tip speed of 25.2 meters per second.

A 200 gram aliquot of pulped fiber with additive, furnace slag fibers, barytes, resin, etc. was removed from the Eirich mixer and placed in a preform mold having a length of 5.31 inches and a width of 1.50 inches. These ingredients and pulp were then placed under 1200 psi pressure for 15 seconds. After 15 seconds of pressure application, pressure was removed for 2 seconds, following which the pressure was reapplied for another 15 seconds. At the end of the second 15 second period of pressure application, the preform thickness was then measured while the preform was in the mold, under pressure. The product of this operation was a preform. The preform was removed from the preform mold and was allowed to stand for a period of about 30 minutes. The preform always increased in thickness somewhat after removal from the mold, but with most of the additives used in Table I, the preform expanded so much that subsequent handling of the preform became impractical. In general, if the preform's height expanded more than 30% after the preform was removed from the preforming mold, the preform's integrity was judged to be too poor for subsequent testing of the preform for strength characteristics. Table II indicates the results of test conducted on preforms made by the above procedure wherein the pulped fiber/additive sample used correlates with Table I.

TABLE II

| Example Number | Additive Used | Amount Additive Used % | % weight acrylic pulp in preform | Instron Test of Pre-Form (pounds to break) |
|---|---|---|---|---|
| 1 | PEG-400 monopelargonate | 54 | 5 | 1.8 |
| 7 | POE (12) Stearic Monoethanolamide | 54 | 5 | 1.0 |

Preforms utilizing pulped acrylic fiber with the additives utilized in Examples 2-6 and 8 were not produced, as the unfavorable results of the white pellet test data found in Table I indicated that any corresponding preform made utilizing these examples would not have enough strength to even form a significant amount of measureable preform strength.

The testing of the preforms was carried out using an Instron testing machine (Model 1122, obtained from Instron Corporation, 3781 N.E. Expressway Access Road Drive, Atlanta, Ga. 30340). A special "three-point breaking apparatus" was constructed for use with the Instron, this apparatus being shown in FIG. 2. For testing of preform strength, the preform (11) was placed on two lower bars (12 and 13). The lower bars (12 and 13) each had a diameter of 1 inch, and were welded to a metal plate (14). The lower bars had parallel axes which were located a distance of 3.31 inches apart. Once the preform (11) was placed on the lower bars (12 and 13) which were mounted in the Instron, an upper bar (15) was lowered from a position above the preform. The upper bar (15) made contact with the preform and thereafter applied pressure to the preform until it broke. The Instron recorded the pounds of force required to break the preform. Table II reports these results. The upper bar (15) was positioned so that it was always equidistant from the lower bars (12 and 13). The diameter of the upper bar was approximately 1 inch. All three bars (12, 13, and 15) were made from steel.

As can be seen from Table II, the pelargonate additive provided a preform strength almost twice that of the POE (12) stearic monoethanolamide. Furthermore, no strength data was believed to be obtainable from the remaining 6 additives found in Table I.

The improved fibrous polyacrylonitrile reinforcing mixture as described in Examples 1-8 was based on a 1.5 denier per filament fiber which was cut and pulped. It has been conceived that 1.5 denier per filament is the most preferred denier per filament. However, the improved product has also been proven to be operable throughout the denier per filament range of 0.5 denier per filament to 20 denier per filament. However, it is preferred that the denier per filament is between 0.5 and 10, and it is more preferred that the denier per filament is between 0.7 and 5, and still more preferred that the denier per filament is between 1 and 2. It has been conceived that the wet gel tow may be cut into a uniform length which may range from 2 millimeters to 30 millimeters. A length of 10 millimeters is most preferred.

In examples 1-8, the improved fibrous polyacrylonitrile reinforcing mixture was comprised of only the most preferred type of acrylic fibers, i.e. homopolymer polyacrylonitrile fibers. Homopolymer polyacrylonitrile fibers are comprised of 100% polyacrylonitrile units. It has been conceived that any form of polyacrylonitrile fiber, i.e. copolymer, terpolymer, tetrapolymer will be operable in the present invention. However, it has been found that homopolymer polyacrylonitrile fibers are more easily fibrillated in the refining (i.e. pulping) process, and for this reason, among others, homopolymer polyacrylonitrile are most preferred.

PEG-400 monopelargonate is the most preferred additive for use in the present invention. It has been conceived, however, that either (1) a blend of caprylic acid and capric acid or (2) heptanoate will render resiliency low enough to provide the advantages of the present invention.

In Examples 1-8, approximately 54% (on a weight basis) of additive was held by the dried fiber. This was proven by extraction of additive from the dried fiber. Thus, every 1 pound of "dry" fiber in the pulped fiber- /additive mixture contained an additional approximately 0.54 pounds of additive. It has been conceived that it is most preferred to incorporate at least 50% (owf, i.e. "weight of fiber") of additive onto the pulped fiber, and this most preferred amount is also the maximum amount of additive that the fiber will hold upon being dried. It has been conceived that the advantages of the present invention may be obtained if at least 37% (as based on weight of dry fiber) of additive is on the fiberous pulp. It is preferred that, on a weight of dry fiber basis, at least 43% of additive is on the fiber, and it is more preferred that this amount is at least 49%.

It has also been conceived that the cut and refined polyacrylonitrile product should have an average length of approximately 1 to 2 millimeters. It is known that the use of specific refiner blade clearance settings will produce an average length of approximately 1 to 2 millimeters, regardless of the length to which the wet gel staple is originally cut.

FIG. 3 illustrates a schematic of a most preferred process for production of the improved fibrous reinforcing mixture of the present invention. A polyacrylonitrile wet gel tow (16) was forwarded by a set of five feed rolls (17), and the tow was drawn into an aspirator (18) and was cut in a cutter (19). A tank (32) supplied a dilute additive solution (31) to the cut gel tow (20), the dilute additive solution (31) being supplied to a vortex bowl (21) via pipe 33. An antifoamant (34) was added to the vortex bowl (21) via pipe 35, simultaneously with the addition of the dilute additive solution (31) to the vortex bowl (21). The antifoamant (34) was manufactured by Dow Corning of Midland, Michigan, and was known as H-10. The antifoamant was added at a rate of 14 cc. per minute. The cut polyacrylonitrile gel two was (20) along with antifoamant (34) and solution 31 were supplied to the first refiner (6) at a ratio of fifty pounds of solution 31 for every one pound of fiber (on a dry weight basis). Fiber was supplied to the cutter at a rate of one pound of fiber (on a dry weight basis) per minute. The wet gel was refined in the refiners (6 and 7), after which excess liquid was removed from the pulped fiber-/additive via centrifuge (8). The additive/refined gel (22) passed from the centrifuge (8) into a dryer (24), via a conveyor (23), the dryer removing substantially all of the water from the additive/refined gel (19), causing the gel structure to collapse.

In addition to the additive/wet gel mixture (22), the centrifuge (8) also emitted excess liquid (comprised of a very dilute additive solution, 25) through pipe 26, along with foam (not shown) which was created during the refining process. These emissions were fed into an effluent tank (36) via pipe 26. In the effluent tank (36), the liquid (25) was separated from the foam. The liquid was then pumped (via pump 37) to the dilute additive tank (32) via pipe 27. Since liquid 25 had a lower concentration of additive than the concentration necessary for application with the cut gel tow, the dilute additive tank (32) was supplied with very dilute solution of water and additive from effluent tank (36) along with a concentrated additive solution (28) from another tank (29). The concentrated additive solution (28) was supplied to the dilute additive tank (32) via pipe 30.

Examples 9–11

The most preferred process (described above) was carried out using a 1.5 denier per filament homopolymer polyacrylonitrile wet get tow having a total denier of 384,000. The gel tow (16) was forwarded (by five feed rolls, 17), drawn into an aspirator (18), cut into lengths of approximately 10 millimeters (in cutter 19), etc., as shown in FIG. 3. The three different additives utilized in these examples were as follows: Example 9: PEG-400 monopelargonate; Example 10: POE (9) Coconut fatty acid; Example 10: POE (12) stearic monoethanolamide. Results of white pellet test, preform handle ability, and preform strength were as follows:

TABLE III

| Example # Number | Additives Species | Amount Additive Applied (owf) | Preform Handle-ability | Resilience (White Pellet) | Preform Strength lbs to break |
|---|---|---|---|---|---|
| 9 | PEG-400 monopelargonate | 54% | Good | 7.1% | 2.8 |
| 10 | POE (9) Coconut fatty acid | 56% | Fair | 9.7% | — |
| 11 | POE (12) Stearic Monoethanolamide | 45% | Fair | 9.4% | — |

In each of Examples 9–11, the additive solution in which the cut gel tow was refined (i.e. the composition of solution 31 as seen in FIG. 3) was made up of approximately 92% water, 8% additive, and 0.08% Irganox ™ antioxidant. Furthermore, the additive solution also contained approximately 0.7% of H-10$^{TM}$ antifoamant, obtained from Dow Corning, the antifoamant improving the drying operation. Preform strength tests were not carried out for Examples 10 and 11.

A comparison of white pellet resiliency of Example 1 versus Example 9, Example 3 versus Example 10, and Example 7 versus Example 11 indicates that the process of making the mixtures of Examples 1–8 was clearly inferior to the process of making the mixtures of Examples 9–11. The amount of improvement (i.e. decreased resilience) between these Examples was not expected. It has been conceived that it is the intimate connection between the wet gel and the additive during the refining process which causes the resulting lower resiliency found in the improved process. The preforms were also made in accordance with those shown in Table II and the accompanying description. A comparison of the preform strength of Example 9 with the preform strength from Example I (see Table II) indicate again that the most preferred process is capable of yielding a considerably stronger preform than the preform obtained by the process utilized in Example 1.

We claim:
1. A fibrous reinforcing mixture suitable for use in friction products comprising:
polyacrylonitrile fibers having a denier per fiber in the range of from 0.5 to about 20 and an average length in the range of from about 1 to about 2 millimeters; at least 37% by weight based on the dry weight of said fibers of a liquid additive combined with said fibers wherein said additive is selected from the group consisting of:
(a) polyethylene glycol esters of pelargonic acid;
(b) polyethylene glycol esters of enanthic, caprylic or capric acids;
(c) blends of polyethylene glycol esters of enanthic, caprylic, pelargonic, or capric acids,
(d) blends of polyethylene glycol esters of carboxylic acids derived from natural products containing at least 50% by weight of carboxylic acids containing less than 14 carbon atoms; and

(e) reaction products of ethylene oxide and carboxylic acid amides wherein at least 70% of the acids from which the amide is derived contain between 16 and 20 carbon atoms; and, an effective amount of an antioxidant.

2. The fibrous reinforcing mixture recited in claim 1, wherein said polyacrylonitrile fibers are homopolymer polyacrylonitrile fibers.

3. The fibrous reinforcing mixture recited in claim 1, wherein said additive comprises the reaction product of pelargonic acid reacted with 9 moles of ethylene oxide.

4. The fibrous reinforcing mixture recited in claim 3, wherein said additive is combined with said fibers in an amount of at least 43% by weight based on the dry weight of said fibers.

5. The fibrous reinforcing mixture recited in claim 3, wherein said additive is combined with said fibers in an amount of at least 49% by weight based on the dry weight of said fibers.

6. The fibrous reinforcing mixture recited in claim 1, wherein said additive is combined with said fibers in an amount of at least 43% by weight, based on the dry weight of said fibers.

7. The fibrous reinforcing mixture recited in claim 1, wherein said additive is combined with said fiber in an amount of at least 49% by weight, based on the dry weight of said fibers.

8. The fibrous reinforcing mixture recited in claim 1 wherein said polyacrylonitrile fibers have a denier per fiber from 0.5 to 10.

9. The fibrous reinforcing mixture recited in claim 1 wherein said polyacrylonitrile fibers have a denier per fiber from 0.7 to 5.

10. The fibrous reinforcing mixture recited in claim 1 wherein the polyacrylonitrile fibers have a denier per fiber from 1 to 2.

11. The fibrous reinforcing mixture recited in claim 3, wherein said polyacrylonitrile fibers have a denier per fiber of about 1.5 and said polyacrylonitrile is a homopolymer, said additive is combined with said fibers in an amount of at least 50% based on the dry weight of said fibers and said antioxidant comprises octadecyl-3,5-di-tert-butyl-4-hydroxyhydrocinnamate.

* * * * *